April 10, 1956
T. D. McCALLUM
2,741,063
CRAB POTS
Filed Aug. 8, 1952
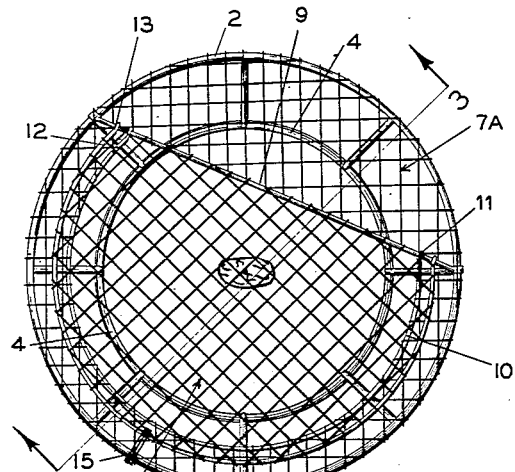
*Fig. 1*
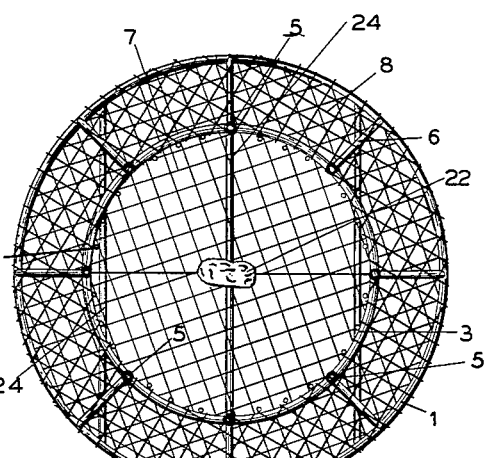
*Fig. 2*
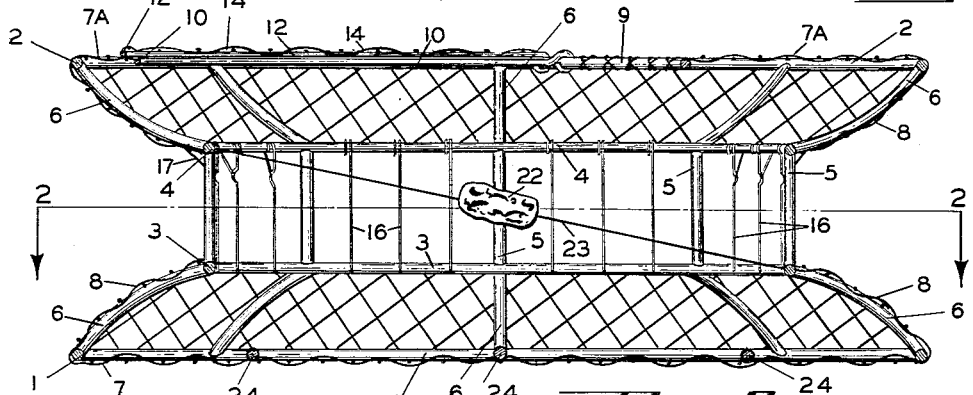
*Fig. 3*
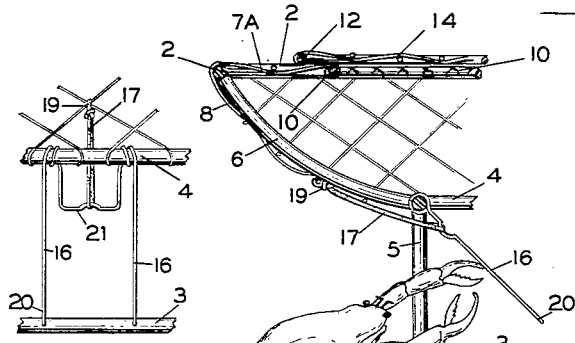
*Fig. 6*
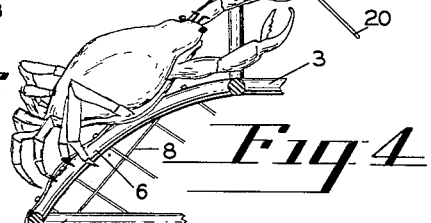
*Fig. 4*
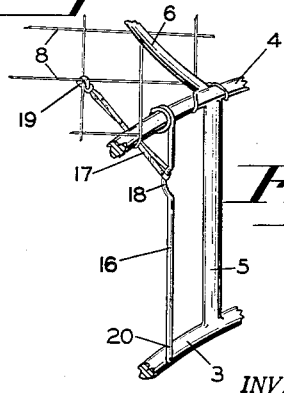
*Fig. 5*
INVENTOR.
TOWNSEND D. McCALLUM
BY
ATTY.

United States Patent Office 2,741,063
Patented Apr. 10, 1956

2,741,063

CRAB POTS

Townsend D. McCallum, Portland, Oreg.

Application August 8, 1952, Serial No. 303,265

2 Claims. (Cl. 43—66)

This invention relates to improvements in crab pots and is particularly adapted to be used for trapping crabs, lobsters, shell fish and the like.

The primary object of my new and improved crab pot is to provide a trap wherein the crabs can enter completely around the circumference of the pot. By this method many more crabs can be caught within a given amount of time by providing easy access to the trap.

A further object of my invention is the provision of a crab pot that will operate with either side up.

A still further object of my improved crab pot is to provide a trap that will stay put more easily, reducing movement of the trap by heavy currents, and that will operate even though it may be one-third sanded down.

My new and improved crab pot has an advantage of lightness in construction, being easy on the lifting gear and adapting itself to being moved more readily from place to place.

These and other incidental objects will be apparent in the drawings, specification and claims.

Referring to the drawings:

Figure 1 is a plan view of my new and improved crab pot.

Figure 2 is a plan sectional view, taken on line 2—2 of Figure 3.

Figure 3 is a transverse sectional view of the pot, taken on line 3—3 of Figure 1.

Figure 4 is an enlarged fragmentary side sectional view, illustrating how the crab enters the trap or pot.

Figure 5 is an enlarged detail fragmentary sectional view, illustrating the principle of the entering gate device.

Figure 6 is another preferred form of mechanical structure of the entering gate.

Referring more specifically to the drawings:

My new and improved crab pot consists of oppositely and parallelly disposed rings 1 and 2, having oppositely disposed inner rings 3 and 4. The inner rings are spaced apart by the spacer bars 5 while the base rings 1 and 2 are connected and spaced to the rings 3 and 4 by the spacers 6.

The base ring 1 is closed or covered with screening 7 clear across its faces, also the spacers 6 are enclosed within the screening 8 as best illustrated in Figure 3. A transverse bar 9 bridges across the base ring 2, as best illustrated in Figure 1. An arcuate bar 10 which is curved along a radius shorter than that of the base ring is fixedly secured to the bar 9 at 11. The base ring 2 is then covered by the screen 7A up to the bar 9 and in from the ring 2 to the inner arcuate bar 10, which leaves an opening relative to the screen.

A second arcuate bar 12 is pivotally connected to the transverse rod 9 at 13 and is covered by the screen material 14. This provides a screen cover for covering the space between the arcuate bar 10 and the transverse bar 9, providing an entrance to the inner part of the pot so that the crabs can be removed. The arcuate bar 12 is held down against the screening 7A and the arcuate bar 10 by any suitable means, as for instance rubber bands 15 stretched from the cover ring 12 over the base ring 2 being connected to the screening 8.

The space between the rings 3 and 4 is bridged by the vertical bars 16, which are pivotally mounted to the ring 4, as best illustrated in Figures 4, 5 and 6. These bars act as gates through which the crab must pass in order to enter the space within the pot between the base rings 1 and 2.

Rubber bands or springs 17 are connected to the vertical bars at 18 and to the screening 8 at 19. These bands or springs pull the lower ends 20 of the vertical bars against the inner edge of the inner ring 3. In Figure 6 I show a modified form of gate wherein the vertical bars 16 may be made double, coiled around the ring 4 and being connected together as illustrated at 21. This structure provides for greater stability of the bars.

The bait 22 is located within the trap and supported by the supporting line 23 stretched from the ring 4 to the ring 3 within the pot. This centers the bait so that it will be in a central location regardless of which side of the pot is up. Transverse bars 24 bridge across the ring 1 and the screening 7 is secured to these bars, providing a support for the said screen.

I will now describe the operation of my new and improved crab pot. The spacer bars 6 and the screening 8 provide a ramp completely around the trap over which the crab can enter, as best illustrated in Figures 3 and 4. The crab bears against the vertical bars 16 forcing the same inwardly against the tension of the rubber bands 17.

After the crab enters the pot, the bars 16 will snap back to the position shown in Figures 3 and 5. The crab then is located within the space between the rings 1 and 2 and within the confines of the rings 3 and 4, including the spacer bars 5 and the gate bars 16. The fact that the crab can enter at any point around the pot insures a greater catch in less time, due to the fact that he can observe the bait and the other crabs from any direction. The rings 1 and 2 hold the gate bars 16 well above the sand line surrounding the trap, even though the pot may settle within the sand.

Another advantage of my crab pot is that it can rest on either of the base rings 1 or 2, catching the crabs in either of these positions as well as at an angle to the horizontal, which would be the case in the event the trap was resting on an uneven surface.

What I claim is:

1. A crab pot comprising equal diameter, round top and bottom rings, two intermediate equal diameter, round spaced apart rings smaller than the top and bottom rings, said intermediate rings being spaced respectively from the top and bottom rings, vertical bars spaced apart and connecting the intermediate rings forming an intermediate cylindrical entrance area spaced from the top and bottom rings, a series of upwardly curved spaced apart bars connecting the top ring and the upper intermediate ring, wire meshing extending over the upwardly curved spaced apart bars, a series of downwardly curved spaced apart bars connecting the lower intermediate ring and the bottom ring, wire meshing covering the downwardly curved spaced apart bars and extending across the bottom ring, spaced apart light closure wires between the vertical bars, said light closure wire being pivoted to the upper intermediate ring and contacting with the inner surface of the lower intermediate ring, resilient means for normally holding the spaced apart light closure wires in vertical position with their ends against the inner surface of the lower intermediate ring, and wire meshing covering the top of the top ring.

2. A crab pot as defined in claim 1, wherein, a closure is provided in the wire meshing over the top ring.

(References on following page)

References Cited in the file of this patent

UNITED STATES PATENTS

| | | |
|---|---|---|
| 876,638 | Harrington | Jan. 14, 1908 |
| 1,146,698 | Franklin | July 13, 1915 |
| 1,262,160 | Barker | Apr. 9, 1918 |
| 2,470,177 | MacDonald | May 17, 1949 |
| 2,520,780 | Pieron | Aug. 29, 1950 |

FOREIGN PATENTS

| | | |
|---|---|---|
| 4,285 | Great Britain | 1898 |
| 980,660 | France | Dec. 27, 1950 |